United States Patent [19]

Vaginay

[11] 3,879,170
[45] Apr. 22, 1975

[54] METHOD OF ACID DYEING POLYESTER FIBERS

[75] Inventor: Yves Vaginay, Lyon, France

[73] Assignee: Rhone-Poulenc-Textile, Paris, France

[22] Filed: Dec. 15, 1972

[21] Appl. No.: 315,582

[30] Foreign Application Priority Data
Dec. 23, 1971  France ............................ 71.46680

[52] U.S. Cl. ...................... 8/168; 8/173; 8/177 AB
[51] Int. Cl. ............................................. D06p 5/00
[58] Field of Search ............. 8/168 C, 173, 177 AB

[56] References Cited
UNITED STATES PATENTS

| | | | |
|---|---|---|---|
| 2,986,444 | 5/1961 | Rokohl et al. | 8/177 AB X |
| 3,032,625 | 5/1962 | Horn | 8/168 C X |
| 3,584,074 | 6/1971 | Shima et al. | 8/168 X |
| 3,643,270 | 2/1972 | Kirschnek et al. | 8/177 AB X |
| 3,652,198 | 3/1972 | Schimauchi | 8/168 |
| 3,700,399 | 10/1972 | Shimauchi | 8/177 AB X |
| 3,773,463 | 11/1973 | Cohen et al. | 8/168 C X |

Primary Examiner—Benjamin R. Padgett
Assistant Examiner—P. A. Nelson
Attorney, Agent, or Firm—Stevens, Davis, Miller & Mosher

[57] ABSTRACT

Good acid dyeing of polyester fibers is obtained by treating with simple or metallized acid dyes polyesters of at least one dihydric alcohol and at least one aromatic dicarboxylic acid, said polyesters containing 1 to 10% of units — with respect to the sum of the recurring units of the polymer — issuing from a product having the formula

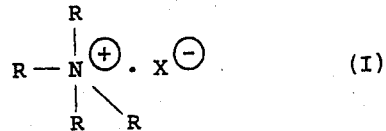

wherein the R's represent aliphatic, cycloaliphatic or aromatic radicals, at least one R being substituted by at least one group capable of forming ester bonds with the recurring polyester units, at least two R's being capable of forming between them a ring which may contain quaternizable nitrogen atoms; and wherein X⁻ is a halogen atom.

9 Claims, No Drawings

METHOD OF ACID DYEING POLYESTER FIBERS

The present invention relates to a method of acid dyeing polyester compositions having good dye affinity for simple and metallized acid dyestuffs.

Polyesters derived from aromatic dicarboxylic acids, and in particular from terephthalic acid and from aliphatic or cycloaliphatic dihydric alcohols have become of great commercial applicability in many uses because of their great toughness, their elasticity, their wrinkle-resistance, etc. However, the threads and fibers obtained from these polyesters are difficult to dye because of the lack of reactive sites in or on the macromolecular chains.

Acid dyes are a category that holds particular interest in view of their light-fastness and also because of their low cost. Unfortunately, in contrast to the polyamides, for instance, polyesters provide no affinity whatever for these kinds of dyes.

U.S. Pat. No. 2,891,929 has proposed introducing aminated groupings into the polyester by replacing part of the diacid by an aminated one during condensation of the diacid with dihydric alcohol. But the polymers so obtained are subject to a pronounced tendency to yellow during the heat treatments they undergo during processing.

It has also been proposed in Japaneese patent application 22318/68 that during the interchange of raw materials or during the polycondensation leading to polyester formation, a mixture of an alkaline earth metal and of quaternary ammonium halide be mixed with the reagents. The polyesters so obtained provide good transparency and resistance to heat, but they do not offer any significant or particular dyeing affinity.

It has also been proposed in U.S. Pat. No. 3,325,454 to produce polyesters of high softening point by esterification and polycondensation in the presence of metal catalysts and 0.0005 – 1.0 mol percent, preferably 0.01 – 0.2 mol percent, of quaternary ammonium compounds. This patent has no suggestion of acid dyeing, and, in fact, no significant acid dyeing can be obtained when utilizing the preferred quantities of quaternary ammonium compounds.

It has now been found that excellent dyeing can be achieved by treating with simple or metallized acid dyes polyesters of at least one dihydric alcohol and at least one aromatic dicarboxylic acid, said polyesters containing 1 to 10% of units — with respect to the sum of the recurring units of the polymer — issuing from a product having the formula

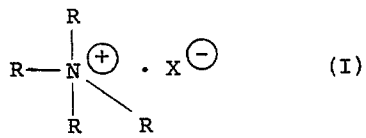
(I)

wherein the R's represent aliphatic, cycloaliphatic or aromatic radicals, at least one R being substituted by at least one group capable of forming ester bonds with the recurring polyester units, at least two R's being capable of forming between them a ring which may contain quaternizable nitrogen atoms; and wherein $X^\ominus$ is halogen atom.

The above-described polyesters may be produced by polycondensing at least one aromatic dicarboxylic acid with aliphatic or cycloaliphatic dihydric alcohols in the presence of 1.0 – 10% mols with respect to the number of mols of the dicarboxylic acid of a product of the formula I. If desired, a small quantity of aliphatic dicarboxylic acid and/or a polyethylene glycol may be added to the reaction mixture in order to modify slightly the properties of the polyester produced; for example 0.1 to 10% of units issuing from said diacid and/or glycol can be added.

The product (I) may be added during the interchange between a compound generating the aromatic dicarboxylic acid and the dihydric alcohols being used. It may also be added during the condensation of the dicarboxylic acid with the dihydric alcohols. Furthermore, if desired, product (I) may be condensed with a dicarboxylic acid that may be aliphatic or aromatic in order to generate a polymer which may be added at any time during the interchange of condensation described above, or which may be merely mixed with a conventional polyester for the purpose of improving its dyeing affinity.

The aromatic dicarboxylic acids which are used in the formation of the polyesters are generally well known and preferably contain from about 8 to about 14 carbon atoms. The dicarboxylic acids or esters thereof may be represented by the formula

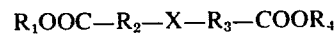

wherein $R_1$ and $R_4$ each represent hydrogen or an alkyl radical containing from 1 to 10 carbon atoms and $R_2$ and $R_3$ each represent $(CH_{2m-1}$, wherein $m$ is an integer of from 1 – 5 inclusive, and X represents a divalent aromatic radical of the formula

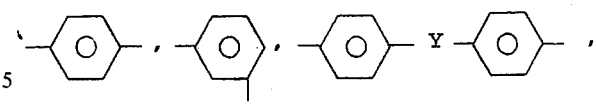

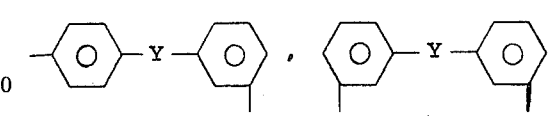

or 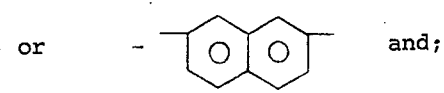 and;

Y represents a radical of the formula

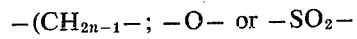

Though terephthalic acid and its alkyl esters are preferred, any of the other above acids or esters of such acids can be employed with good results.

As indicated above, small quantities of an aliphatic dicarboxylic acid and/or of a polyethylene glycol may be included in the reaction mixture to modify the properties of the polyester. The aliphatic dicarboxylic acids or esters thereof are represented by the formula

wherein $R_1$ and $R_3$ are either hydrogen or alkyl radicals containing from 1 to 10 carbon atoms, and $R_2$ is an aliphatic hydrocarbon radical. Thus, typical aliphatic dibasic dicarboxylic acids which can be employed include oxalic acid, succinic acid, adipic acid, sebacic acid, α, α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

In general, the preferred aliphatic dicarboxylic acids contain from about 6 to about 12 carbon atoms.

The dihydric alcohols or esters thereof which may be employed in forming the polyesters may be aliphatic or cycloaliphatic. The aliphatic alcohols may be represented by the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols.

Cycloaliphatic alcohols may be represented, for example, by the formula

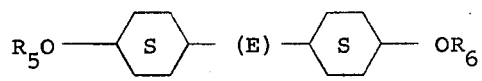

wherein $R_5$ and $R_6$ are as previously described and E is a branched or straight chain alkyl group having 1 to 5 carbon atoms. One such dihydric alcohol which is preferred is bis(4-hydroxycyclohexyl)2-2-propane. The cycloaliphatic alcohols may also be represented by the formula

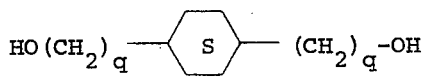

wherein $q$ is an integer of 1 to 5. A preferred example of such alcohols is cyclohexane dimethane diol.

The formation of the polyesters is, per se, a well known procedure and as previously indicated, is described in U.S. Pat. No. 2,891,929. The proportions of dicarboxylic acid and dihydric alcohol may be varied over a fairly wide range, but, in general, the dihydric alcohol is used in excess amounts of up to about 5 times.

In the formula (I) listed above, R may be an aliphatic group represented by the formula $-(CH_2)_a-Z$ wherein $a$ is an integer from 1 to 12, and $Z$ = H, COOH, COOR', OH and wherein R' is an alkyl of 1 to 10 carbon atoms, or R may be an aromatic radical represented by the formula

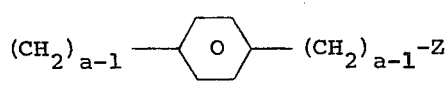

wherein a and Z have the same significance as above. R may also be a cycloaliphatic radical represented by the formula

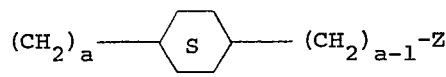

wherein a and Z have the same meaning as above. Two or three R radicals may together form a cycle which may contain nitrogen atoms that can be rendered quaternary as is stated above. Representative of such cyclic formation are the following wherein a and Z have the same significance as above.

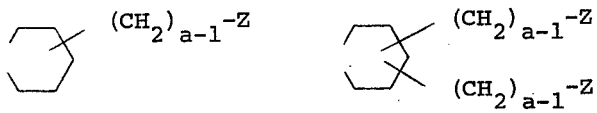

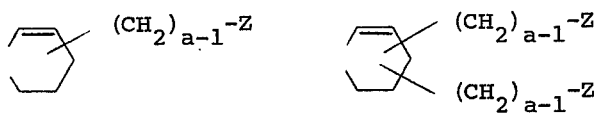

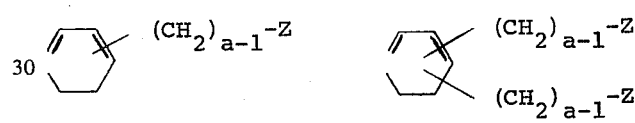

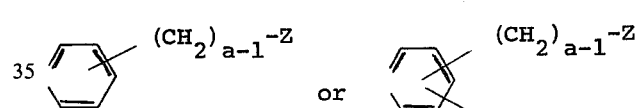

In general, the R radicals may possess from about 1 to about 30 carbon atoms.

In the above formula (I), the anion may be chloride, bromide, or iodide.

As products of formula (I), there may be cited, for instance, quaternary ammonium chlorides, bromides and iodides having at least one group capable of forming ester bonds which is borne by one or more of the radicals bound to a nitrogen atom. Thus, one can use the chlorides, bromides or iodides of benzyl methyl-di-(β-hydroxy ethyl) ammonium, dibenzyl di-(β-hydroxy ethyl) ammonium, benzyl-tri-(β-hydroxy ethyl) ammonium, dimethyl di-(β-hydroxy ethyl) ammonium, methyl ethyl di-(β-hydroxy ethyl) ammonium, N,N'-dimethyl, N,N'-di-(β-hydroxy ethyl) piperazinium, trimethyl (2-hydroxy 5-carbomethoxy) benzyl ammonium, methyl benzyl di (γ-carboxy propyl) ammonium, dimethyl di-(γ-carboxy propyl) ammonium, dibenzyl di-(γ-carboxy propyl) ammonium, etc.

As previously indicated, the compositions obtained have good dye affinity for simple and metal-bearing acid dyestuffs. This dye affinity is particularly important when the polymers are to be used for the manufacture of yarns and fibers. The methods of acid dyeing by treating with simple or metallized acid dyes are, of course, well known.

Polyesters containing 1–3% of units from product (I), with respect to the total number of the polyesters recurring units, are generally preferred, on technical, practical and economic grounds.

Articles that are so dyed offer a particularly good lightfastness and also are quite resistant to washing, to degreasing and to sublimation, the dyes being chemically bonded to the fiber.

Further, mixed polyester-wool cloths may be dyed in a single bath, and this represents an assured economic advantage.

Furthermore, articles may be made when starting from dyeable threads admitting basic dyes (polyesters which are modified by $SO^3Na$ sites, for instance) and with threads admitting acid dyes according to the invention. By dyeing raw items with base and acid dyes, contrasting color effects may be achieved, each thread only admitting its own dye.

The process according to this invention holds particular interest when polyesters from $C_4$ and higher dihydric alcohols are utilized, even though worthwhile results are achieved with $C_2$ dihydric alcohol polyesters. It is notably surprising that products containing one anion and one cation of quaternary ammonium may endow the ensuing polymers with dyeing affinity for acid dyes.

In the examples below, parts and percentages refer to weights, except when indicated otherwise; the examples are provided for illustration and do not limit the scope of the invention.

In these examples, the dyes are designated by their references CI, 1956 edition of the Colour Index and its supplements, and the viscosity index IV is determined by the viscosity in solution measured at 25° C., where the solution consists of 1% weight per volume of polymer in orthochlorophenol, and given by the formula IV = specific viscosity/concentration × 1,000 where concentration is expressed in gram/liter.

EXAMPLE 1

Benzyl methyl-di-($\beta$-hydroxy ethyl) ammonium chloride (A) is prepared from benzyl chloride and methyl diethanolamine. The crude salt obtained is dissolved in water and the solution is purified by extraction with ethyl acetate and bleached with vegetable black. The purified salt is recovered by evaporation in vacuum.

Sebacoyl chloride is added in stoichiometric quantities slowly, with agitation, to the molten product A; the mixture is heated to bring the temperature to 150° C. while lowering the pressure to 20 mm Hg, whereupon this temperature is maintained first of all for 1 hour at 20 mm Hg and then for 1 hour at 1 mm Hg. In this way there is obtained a pale yellow polymer B which softens at about 100° C.

There are simultaneously introduced into a stainless steel reactor:

| | |
|---|---|
| dimethyl terephthalate | 3880 parts |
| butanediol-1,4 | 2250 parts |
| triethanolamine titanate | 0.9 parts |

The mixture is heated and the methanol formed by the reaction is distilled off.

When the temperature reaches 250° C., 88 parts of a 20% suspension of titanium dioxide in butanediol are added. The pressure is gradually dropped to 1 mm Hg over 40 minutes, while the temperature of the mass is brought to 260° C.

After polycondensation for 45 minutes, 166 parts of polymer B are added through an air lock and the polycondensation is continued for 15 minutes.

There is obtained a white polymer which is cast, cooled and granulated, of a viscosity index of 100, a viscosity in the molten state of 1500 poises at 260° C. and a softening point of 222.6° C.

After drying for 2 hours at 140° C., the grains of polymers are melted and extruded at 260° C. through a spinneret having 23 apertures of 0.34 mm diameter and the yarns obtained, wound up at 1200 m/min., are then stretched over blade and plate under the following conditions:

| | |
|---|---|
| temperature of blade | 80° C. |
| temperature of plate | 120° C. |
| draw ratio | 3.4 X |
| drawing rate | 700 m/min. |

The yarn obtained has a count of 85 dtex/23 strands, a dry strength of 25 g/tex and a dry elongation of 25%. A batch of 2 g of this yarn is placed in 100 ml of a bath having the following composition:

| | |
|---|---|
| CI Acid Green 88 | 0.4 g |
| diammonium phosphate | 1 g |
| condensate of stearyl and oleyl amines with ethylene-oxide | 0.5 g |
| water | q.s. to 1000 ml |
| acetic acid | q.s. to pH of 5 |
| trichlorobenzene | 10 g |

After boiling for 45 min. in this bath, the yarn is washed at 60° C. in an aqueous solution containing 1.5% of an alkyl sulfate, rinsed and dried.

It has an intense green color. This color remains intact after extractions of 20 minutes with acetone and methylene chloride.

As a control, a tetramethylene glycol polyterephthalate yarn prepared under identical conditions, but without the addition of polymer B during polycondensation, assumes only a very light yellowish-green color which disappears completely during washing at 60° C. under the above conditions.

EXAMPLE 2

There are introduced simultaneously into a stainless steel reactor:

| | |
|---|---|
| dimethyl terephthalate | 3880 parts |
| ethyleneglycol | 3100 parts |
| manganese acetate tetrahydrate | 1.9 parts |
| trivalent antimony oxide | 1.6 parts |

The mixture is heated and the methanol formed by the reaction is distilled off.

When the temperature reaches 225° C., 6.3 parts of a 10% glycol solution of phosphorous acid are added and then, at 230° C., 96 parts of a 20% glycol suspension of titanium dioxide.

When the temperature of the mass reaches 240° C., the pressure is gradually lowered to 0.4 mm Hg within the course of 40 minutes while the temperature is brought to 280° C.

After polycondensation for 50 minutes, the vacuum is removed under nitrogen, 166 parts of the polymer B obtained in Example 1 are added, and the vacuum is re-established over 15 minutes.

There is obtained a polymer which is cast, cooled in water and granulated, with a viscosity index of 60, a viscosity in the molten state at 275° C. of 1500 poises and a softening point of 259.8° C.

After drying under vacuum for 3 hours at 150° C., the grains are extruded at 275° C. through a spinneret having 23 apertures of a diameter of 0.34 mm, and the yarns obtained are wound up at 85 m/min and then stretched over blade and plate under the following conditions:

| temperature of blade | 85° C. |
| temperature of plate | 110° C. |
| draw ratio | 5 X |
| drawing rate | 110 m/min. |

The yarn obtained has a count of 75 dtex/23 strands, a dry strength of 25.4 g/tex and an elongation of 18%. A batch of 2 g of this yarn is placed in 100 ml of a bath having the following composition:

| Cl Acid Red 266 | 0.4 g |
| diammonium phosphate | 1 g |
| condensate of stearyl and oleyl amines with ethylene oxide | 0.5 g |
| water | q.s. to 1000 ml |
| acetic acid | q.s. to pH of 3–4 |
| ortho-phenyl phenol | 10 g |

After boiling for 45 minutes in this bath, the yarn is washed at 60° C. in an aqueous solution containing 1.5% of an alkyl sulfate, rinsed and dried.

It has a red color and this color remains intact after extraction for 20 minutes in acetone and methylene chloride.

As a control, a batch of ethylene glycol polyterephthalate prepared under identical conditions, assumes only a pink color which disappears completely upon washing at 60° C.

EXAMPLE 3

There are introduced simultaneously into a stainless steel reactor:

| dimethyl terephthalate | 3490 parts |
| dimethyl isophthalate | 390 parts |
| butanediol-1,4 | 2250 parts |
| 10% butyl ortho-titanate in butanediol-1,4 | 11 parts |

The mixture is heated and the methanol formed is distilled over.

When the temperature in the center reaches 245° C., 88 parts of a 20% butanediol suspension of titanium dioxide are added, the pressure is gradually decreased to 0.8 mm Hg over 40 minutes, and the temperature of the mass is brought to 255° C.

After polycondensation for 1 hour, 166 parts of the polymer B obtained in Example 1 are introduced through an air lock, whereupon the polycondensation is continued under vacuum at 225° C. for 20 minutes.

The polyester is then cast and granulated. It has a viscosity index of 94, a viscosity in the molten state at 260° C. of 1300 poises and a softening point of 190° C.

The granules thus obtained are dried for 2 hours at 140° C. and extruded at 260° C. through a spinneret having 33 orifices of a diameter of 0.50 mm.

| speed of winding | 1,400 m/min. |
| The filaments are then drawn over blade and plate: | |
| temp. ° C. of blade | 80° C. |
| temp. ° C. of plate | 160° C. |
| draw ratio | 2.6 X |
| rate of drawing | 700 m/min. |

Characteristics of the yarn obtained:

| count | 155 dtex/33 strands |
| dry strength | 32.8 g/tex |
| elongation dry | 18% |

A batch of 2 g of this yarn is placed in 100 ml of bath having the following composition:

| Cl Acid Blue 14 | 0.4 g |
| diammonium phosphate | 1 g |
| condensate of stearyl and oleyl amines of ethylene oxide | 0.5 g |
| water | q.s. to 1000 ml |
| hydrochloric acid | q.s. to pH of 3–4 |

After boiling for 45 minutes, this batch is washed at 60° C. in a 1.5% aqueous solution of an alkyl sulfate, rinsed and dried. The yarn is blue.

This color does not disappear upon extraction for 20 minutes in acetone and methylene chloride.

As a control, the same copolyester is prepared but without the introduction of polymer B. The yarns obtained are dyed under the same conditions, but the light blue color which they assume disappears completely upon washing at 60° C.

EXAMPLE 4

Dibenzyl-di-($\beta$-hydroxy ethyl) ammonium chloride (C) is prepared by benzyl chloride and benzyl diethanolamine. The salt obtained is dissolved in water and purified by extraction with ether and ethyl acetate and then bleached with vegetable black. The purified salt is recovered by evaporation under vacuum.

There are introduced simultaneously into a stainless steel reactor:

| dimethyl terephthalate | 3880 parts |
| butanediol-1,4 | 2250 parts |
| triethanolamine titanate | 0.9 part |

The mixture is heated and the methanol formed by the reaction is distilled over.

When the temperature of the mass reaches 250° C., 88 parts of a 20% butanediol suspension of titanium dioxide are added.

Over 40 minutes, the pressure is gradually lowered to 1 mm Hg, while the temperature of the mass is brought to 260° C.

At the end of 1 hour of polycondensation, atmospheric pressure is re-established with nitrogen and 130 parts of product C are added. The vacuum is re-established for 15 minutes with agitation.

The slightly yellow polymer is then cast, cooled in water and granulated; it has a viscosity index of 80, a viscosity in the molten state at 260° C. of 1200 poises and a softening point of 222.4° C.

The granules are then dried for 3 hours at 140° C. and extruded at 275° C. through a spinneret having 23 orifices of 0.34 mm diameter. Speed of winding: 75 m/min.

The filaments thus obtained are drawn over blade and plate:

| | |
|---|---|
| temp. °C. of blade | 80° C. |
| temp. °C. of plate | 115° C. |
| draw ratio | 4.6 X |
| drawing rate | 200 m/min. |
| There is obtained a yarn of | |
| a count of | 85 dtex/23 strands |
| dry strength | 24.5 g/tex |
| dry elongation | 22% |

A batch of 2 g of this yarn is placed in 100 ml of bath of the following composition:

| | |
|---|---|
| CI Acid Blue 40 | 0.4 g |
| diammonium phosphate | 1 g |
| condensate of stearyl and oleyl | |
| amines on ethylene oxide | 0.5 g |
| water | q.s. to 1000 ml |
| acetic acid | q.s. to pH of 3-4 |
| trichlorobenzene | 10 g |

After 45 minutes at 98° C. and washing at 60° C. with a 1.5% aqueous solution of an alkyl sulfate, a blue yarn is obtained.

This color remains intact after extraction for 20 minutes with acetone and methylene chloride.

As a control, the tetramethyl glycol polyterephthalate prepared, spun and dyed under the same conditions but without the addition of product C during the polycondensation, assumes only a slight color which disappears completely upon washing at 60° C.

EXAMPLE 5

Benzyl-tri-($\beta$-hydroxy ethyl) ammonium chloride (D) is prepared from benzyl chloride and triethanolamine. The salt obtained is dissolved in water, washed with ethyl acetate and bleached with vegetable black. The salt thus purified is recovered by evaporation under vacuum.

There are simultaneously introduced into a stainless steel reactor:

| | |
|---|---|
| dimethyl terephthalate | 3880 parts |
| butanediol-1,4 | 2250 parts |
| titanium aminotriethanolate | 0.9 part |

The mixture is heated and the methanol formed is distilled over.

When the temperature of the mass reaches 245° C., 88 parts of a 20% butanediol suspension of titanium dioxide are added, whereupon, within the course of 40 minutes, the pressure is progressively dropped to 1 mm Hg, while the mass is brought to 255° C.

Polycondensation is effected in 1 hour. Atmospheric pressure is re-established with nitrogen and 230 parts of product D are added.

The vacuum is re-established for 15 minutes with agitation.

The polyester thus obtained is cast, cooled in water and granulated.

The slightly yellow granules have the following characteristics:

| | |
|---|---|
| viscosity index | 98 |
| viscosity in molten state at | |

-Continued

| | |
|---|---|
| 260° C. | 1500 poises |
| softening point | 223.4° C. |

They are dried for 3 hours at 140° C. and extruded through a spinneret having 23 orifices of 0.34 mm diameter. Speed of winding: 800 m/min.

The filaments are then stretched over blade and plate:

| | |
|---|---|
| temp. °C. of blade | 80° C. |
| temp. °C. of plate | 120° C. |
| draw ratio | 4.4 X |
| rate of drawing | 600 m/min. |
| Their count is | 90 dtex/23 strands |
| dry strength | 29.2 g/tex |
| dry elongation | 22% |

A batch of 2 g of this yarn is dyed in 100 ml of a bath of the following composition:

| | |
|---|---|
| CI Acid Red 266 | 0.4 g |
| ammonium phosphate | 1 g |
| condensate of stearyl and oleyl | |
| amines on ethylene oxide | 0.5 g |
| water | q.s. to 1000 ml |
| acetic acid | q.s. to pH of 3-4 |
| ortho-phenyl phenol | 10 g |

After boiling for 45 minutes, washing in water at 60° C. containing 1.5% of an alkyl sulfate, rinsing and drying, the yarn is of a deep-red color.

This color does not disappear upon extraction for 20 minutes in acetone and methylene chloride.

As a control, a tetramethylene glycol polyterephthalate, prepared and dyed under the same conditions but without the addition of product D during the polycondensation, assumes only a pink color which disappears almost completely upon washing with soap and water and extraction in methylene chloride.

EXAMPLE 6

There are introduced simultaneously into a stainless steel reactor:

The mixture is heated and the methanol formed is distilled over.

When the temperature of the mass reaches 240° C., 88 parts of 20% butanediol suspension of titanium dioxide are added, and then, when the temperature of the mass reaches 250° C., 230 parts of product D are added.

The pressure is gradually reduced within the course of 40 minutes to 1 mm Hg, while the mass is brought to 255° C.

At the end of 45 minutes of polycondensation, the polyester is very viscous and can be cast, cooled in water and granulated.

There is obtained a polymer having yellow shimmer with the following characteristics:

| | |
|---|---|
| viscosity index | 108 |
| viscosity in molten state | |
| at 260° C. | 1600 poises |
| softening point | 223.6° C. |

The grains of polymer are dried for 2 hours at 140° C. and then extruded through a spinneret having 23 orifices of 0.50 mm diameter. Speed of winding: 500 m/min.

The yarns obtained are drawn over blade and plate:

| | |
|---|---|
| temp. °C. of blade | 85° C. |
| temp. °C. of plate | 125° C. |
| draw ratio | 4.4 X |
| rate of drawing | 400 m/min. |
| Their count is | 87 dtex/23 strands |
| dry strength | 26.8 g/tex |
| dry elongation | 18% |

A batch of 2 g of this yarn is dyed in 100 ml of a bath of the following composition:

| | |
|---|---|
| CI Acid Red 226 | 0.4 g |
| diammonium phosphate | 1 g |
| condensate of stearyl and oleyl amines on ethylene oxide | 0.5 g |
| water | q.s. to 1000 ml |
| acetic acid | q.s. to pH of 3-4 |
| trichlorobenzene | 10 g |

Upon heating for 45 minutes at 98° C. and washing at 60° C. with water containing 1.5% of an alkyl sulfate, the batch retains its bright red color.

This color remains after extraction for 20 minutes with acetone and methylene chloride.

As a control, an identical polyester, but without addition of product D, does not become dyed under similar conditions of dyeing.

What is claimed is:

1. In the method of dyeing polyester fibers, the improvement comprising using as said fibers a polyester composition comprising polyesters of at least one dihydric alcohol and at least one aromatic dicarboxylic acid, said polyesters containing 1 to 10% of units with respect to the sum of the recurring units of the polymer issuing from a product having the formula

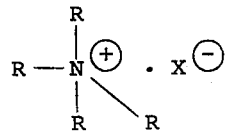
(I)

wherein the R's represent aliphatic, cycloaliphatic or aromatic radicals, at least one R being substituted by at least one group capable of forming ester bonds with the recurring polyester units, at least two R's being capable of forming between them a ring which may contain quaternizable nitrogen atoms; and wherein X<sup>⊖</sup> is a halogen atom, and treating said fibers with acid dyes selected from the group consisting of simple and metallized acid dyes.

2. A method according to claim 1, wherein the polyester contains 1 to 3% of units issuing from the product of formula (I) with respect to the recurring units of the polymer.

3. A method according to claim 1, wherein the polyesters contain 0.1 to 10% units derived from an aliphatic dicarboxylic acid having 2 to 10 carbon atoms.

4. A method according to claim 1, wherein the aromatic dicarboxylic acid contains 8 to 14 carbon atoms and the dihydric alcohols are aliphatic or cycloaliphatic alcohols which contain 2 to 10 carbon atoms.

5. A method according to claim 1, wherein R is an aliphatic radical represented by the formula

where $a$ is an integer from 1 to 12 and Z is H, COOH, COOR', or OH where R' is an alkyl of 1 to 10 carbon atoms.

6. A method according to claim 1, where R is an aromatic radical of the formula

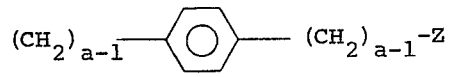

where $a$ is an integer of 1 to 12 and Z is H, COOH, COOR', or OH where R' is an alkyl of 1 to 10 carbon atoms.

7. A method according to claim 1, where R is a cycloaliphatic radical represented by the formula

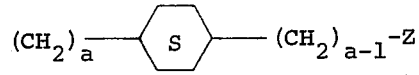

where a is an integer from 1 to 12 and Z is H, COOH, COOR', or OH where R' is an alkyl of 1 to 10 carbon atoms.

8. A method according to claim 1, wherein at least two R's form rings of the formula

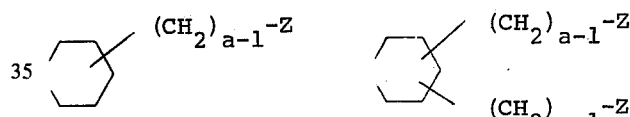

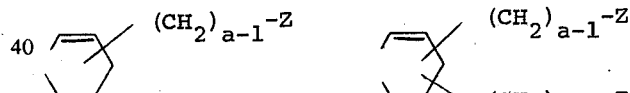

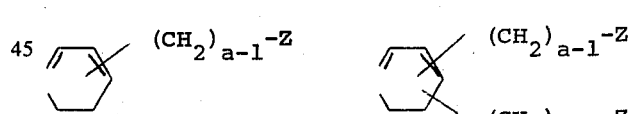

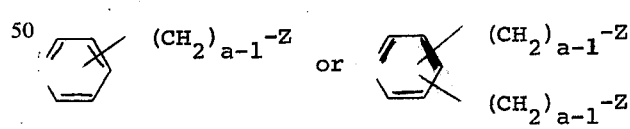

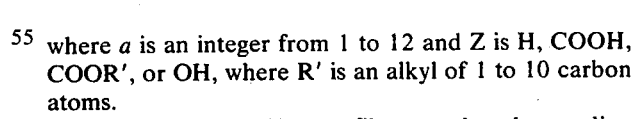

where $a$ is an integer from 1 to 12 and Z is H, COOH, COOR', or OH, where R' is an alkyl of 1 to 10 carbon atoms.

9. The acid dyed polyester fibers produced according to the method of claim 1.

* * * * *